United States Patent
Chen et al.

(10) Patent No.: US 12,125,306 B2
(45) Date of Patent: Oct. 22, 2024

(54) METHOD AND APPARATUS FOR PERSON RE-IDENTIFICATION

(71) Applicant: Realtek Semiconductor Corp., HsinChu (TW)

(72) Inventors: Chien-Hao Chen, HsinChu (TW); Chao-Hsun Yang, HsinChu (TW); Chih-Wei Wu, HsinChu (TW); Shih-Tse Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 344 days.

(21) Appl. No.: 17/685,383

(22) Filed: Mar. 3, 2022

(65) Prior Publication Data

US 2023/0154223 A1    May 18, 2023

(30) Foreign Application Priority Data

Nov. 18, 2021 (TW) ................................. 110142967

(51) Int. Cl.
*G06V 40/10* (2022.01)
*G06V 10/74* (2022.01)
*G06V 40/50* (2022.01)

(52) U.S. Cl.
CPC .............. *G06V 40/10* (2022.01); *G06V 10/74* (2022.01); *G06V 40/50* (2022.01)

(58) Field of Classification Search
None
See application file for complete search history.

(56) References Cited

U.S. PATENT DOCUMENTS

| 2013/0343642 A1* | 12/2013 | Kuo | G06V 10/56 |
| | | | 382/159 |
| 2014/0184803 A1* | 7/2014 | Chu | G06T 7/292 |
| | | | 348/159 |

(Continued)

FOREIGN PATENT DOCUMENTS

| CN | 106295313 A | 1/2017 |
| CN | 112232439 A * | 1/2021 |

(Continued)

OTHER PUBLICATIONS

Nambiar et al., Gait-based Person Re-identification: A Survey, ACM Computing Surveys (CSUR), vol. 52, Issue 2 Article No. 33, pp. 1-34, 2019, doi.org/10.1145/3243043.*

(Continued)

*Primary Examiner* — Guillermo M Rivera-Martinez
(74) *Attorney, Agent, or Firm* — Winston Hsu

(57) ABSTRACT

A method of performing person re-identification includes: obtaining a person feature vector according to an extracted image containing a person; obtaining state information of the person according to a state of the person in the extracted image; comparing the person feature vector with a plurality of registered person feature vectors in a database; when the person feature vector successfully matches a first registered person feature vector of the plurality of registered person feature vectors, identifying the person as a first identity corresponding to the first registered person feature vector; and selectively utilizing the person feature vector to update one of the first registered person feature vector and at least one second registered person feature vector that correspond to the first identity according to the state information.

6 Claims, 5 Drawing Sheets

(56) References Cited

U.S. PATENT DOCUMENTS

| | | | | |
|---|---|---|---|---|
| 2016/0063335 | A1* | 3/2016 | Wang | G06V 40/70 |
| | | | | 382/115 |
| 2016/0125232 | A1* | 5/2016 | Zhang | G06V 10/764 |
| | | | | 382/118 |
| 2018/0075300 | A1* | 3/2018 | Mai | G06V 40/10 |
| 2018/0260630 | A1* | 9/2018 | Cao | G06V 10/764 |
| 2018/0374233 | A1* | 12/2018 | Zhou | G06F 18/22 |
| 2020/0126241 | A1* | 4/2020 | Wang | G06N 3/048 |
| 2020/0151441 | A1* | 5/2020 | Doumbouya | G06V 40/10 |
| 2021/0117687 | A1* | 4/2021 | Ren | G06V 10/764 |
| 2022/0318621 | A1* | 10/2022 | Gong | G06N 3/006 |

FOREIGN PATENT DOCUMENTS

| | | | | |
|---|---|---|---|---|
| CN | 112884804 A | * | 6/2021 | G06T 7/246 |
| CN | 113191183 A | * | 7/2021 | |

OTHER PUBLICATIONS

Gong et al., Person Re-Identification Based on Two-Stream Network With Attention and Pose Features, in IEEE Access, vol. 7, pp. 131374-131382, 2019, doi: 10.1109/ACCESS.2019.2935116.*

Gong et al., Person Re-identification with Global-Local Background_bias Net, Journal of Visual Communication and Image Representation, vol. 74, pp. 1-14, 2021, doi.org/10.1016/j.jvcir.2020.102961.*

Saghafi et al., Review of Person Re-identification Techniques, IET Computer Vision, pp. 455-474, 2014, arXiv:1511.02319, doi.org/10.48550/arXiv.1511.02319.*

Bazzani et al., Symmetry-driven accumulation of local features for human characterization and re-identification, Computer Vision and Image Understanding, vol. 117, Issue 2, pp. 130-144, 2013, doi.org/10.1016/j.cviu.2012.10.008.*

* cited by examiner

VCreg_k_1　　　　　VCreg_k_2　　　　　VCreg_k_3

VCreg_k_1　　　　　VCreg_k_2　　　　　VCreg_k_3

METHOD AND APPARATUS FOR PERSON RE-IDENTIFICATION

BACKGROUND OF THE INVENTION

1. Field of the Invention

The present invention relates to person re-identification, and more particularly, to a method and related apparatus for managing registration and updating of a person re-identification database based on state information regarding persons, so as to perform person re-identification.

2. Description of the Prior Art

Generally speaking, deep learning networks for recognition-related applications, such as person re-identification, roughly includes two processes: identity registration and database matching. During the identity registration process, after obtaining a source image of a person, the deep learning network will output a person feature vector representing the person. The person feature vector and the person's identity (input manually by the user or automatically by the system) will be associated and then registered to a database. As such, the identity registration is completed. During the database matching process, when the person again appears in another source image, the deep learning network again generates a person feature vector from another source image accordingly. After that, the deep learning network uses the current person feature vector to compare with all registered feature vectors in the database. If a distance between a person feature vector and a certain registered feature vector in the database is less than a threshold, it is determined that the person's identity is associated with the registered vector. In view of this, if the registered person feature vector in the database cannot accurately cover person's possible state or posture change, recognition will fail. That is, control and management of identity registration will directly affect the accuracy of identification.

SUMMARY OF THE INVENTION

In view of above, the present invention provides a method and a related apparatus for managing information updating and registration of a re-identification database based on state information of persons, so as to perform person re-identification. In order to track person's state or posture changes, embodiments of the present invention will update the re-identification database timely. Once a current person feature vector calculated from a source image successfully matches a registered vector in the re-identification database, the present invention uses the current person feature vector to update the registered vector in the re-identification database. Furthermore, in order to ensure that the re-identification database can cover person's all possible state or posture changes, embodiments of the present invention will also take person's current state or posture identified from the source image into consideration when performing information registration and updating of the re-identification database. That is, the current person feature vector will only be utilized to update the registered vector corresponding to a certain state or posture that is similar to or related to the person's current state or posture. In this way, the re-identification database can retain registered vectors corresponding to certain states or postures that are significantly different from person's current state or posture. As such, it can be guaranteed that the person can be always correctly identified even when person's subsequent state or posture changes drastically.

According to one embodiment, a method of performing person re-identification is provided. The method comprises: obtaining a person feature vector according to an extracted image having a person; obtaining state information of the person according to a state of the person in the extracted image; comparing the person feature vector with a plurality of registered person feature vectors in a re-identification database; when the person feature vector successfully matches a first registered person feature vector of the plurality of registered person feature vectors, identifying the person as a first identity that corresponds to the first registered person feature vector; and selectively utilizing the person feature vector to update one of the first registered person feature vector and at least one second registered person feature vector that correspond to the first identity according to the state information.

According to one embodiment, an apparatus of performing person re-identification is provided. The apparatus comprises: a storage unit and a processing unit. The storage unit is configured to store program codes. The processing unit is configured to execute the program codes, thereby to perform operations of: obtaining a person feature vector according to an extracted image having a person; obtaining state information of the person according to a state of the person in the extracted image; comparing the person feature vector with a plurality of registered person feature vectors in a re-identification database; when the person feature vector successfully matches a first registered person feature vector of the plurality of registered person feature vectors, identifying the person as a first identity that corresponds to the first registered person feature vector; and selectively utilizing the person feature vector to update one of the first registered person feature vector and at least one second registered person feature vector that correspond to the first identity according to the state information.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known structures, materials or steps have not been presented or described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
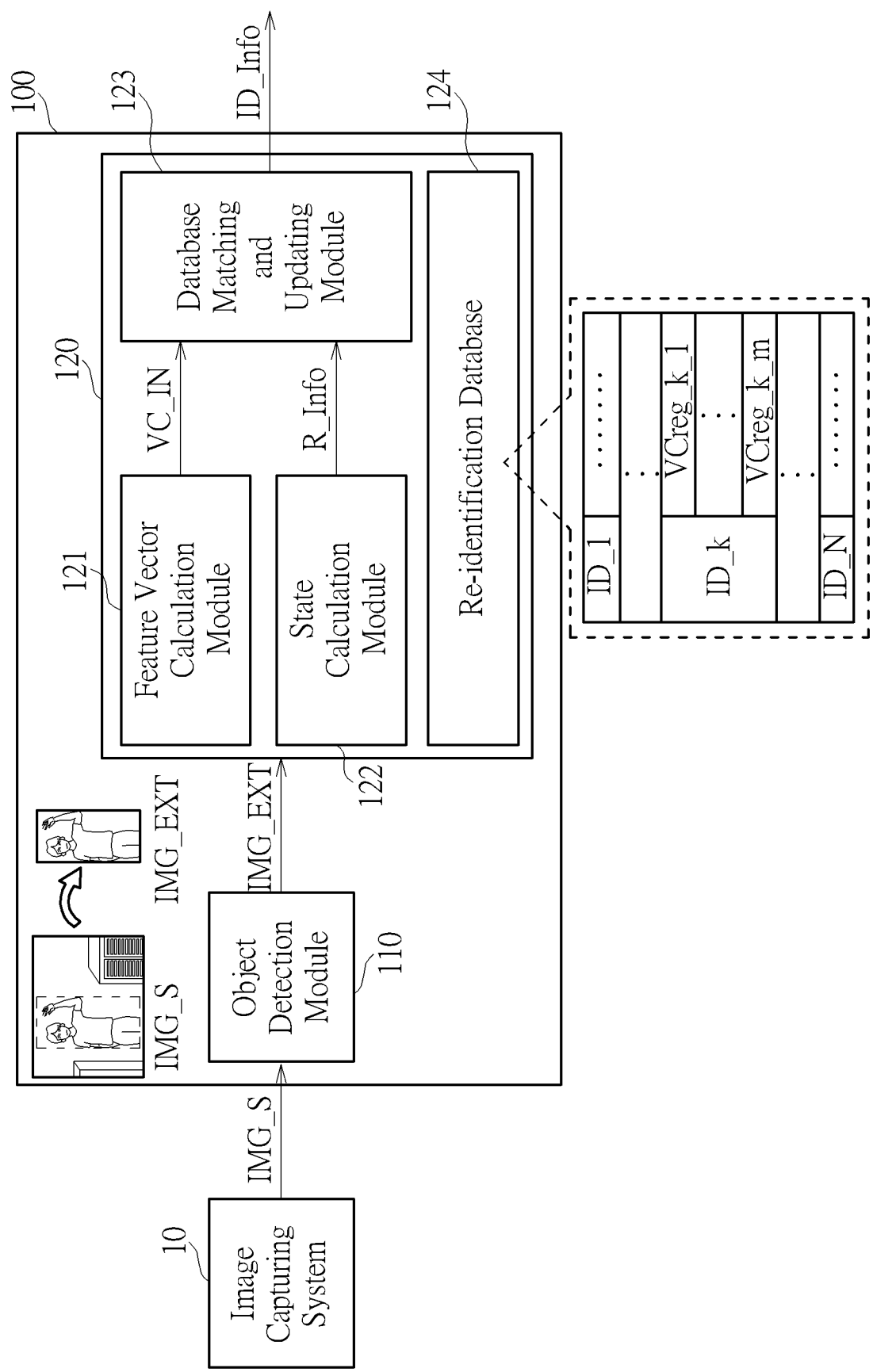
FIG. 1 illustrates a schematic diagram of a person re-identification system according to one embodiment of the present invention.

Embodiments of the present invention provide a person re-identification system. Please refer to architecture shown by FIG. 1. A person re-identification system 100 includes: an object detection module 110 and a person re-identification module 120. Images generated by an image capturing system 10 are provided to the object detection module 110. In some embodiments, the image capturing system 10 may be provided with one or more video/still cameras. If the image capturing system 10 is provided with multiple video/still cameras, cameras may be disposed in different or adjacent locations, such as: streets, indoor spaces, etc. Furthermore, the image capturing system 10 may output an image sequence to the object detection module 110. When the object detection module 110 receives a source image IMG_S, it will perceive a shape of a person CK in it, thereby discriminating an existence of the person CK, and extracting a smaller image IMG_EXT including the person CK from the source image IMG_S. The extracted image IMG_EXT is then provided to the re-identification module 120. The re-identification module 120 includes a feature vector calculation module 121, a state calculation module 122, a database matching and updating module 123, and a re-identification database 124 to implement the person re-identification.

The feature vector calculation module 121 is operable to convert the shape of the person in the extracted image IMG_EXT into a person figure feature vector VC_IN, where the person feature vector VC_IN may reflect: (but not limited to): a figure of the person CK, a posture of the person CK, dress colors of the person CK. The state calculation module 122 is operable to identify a state of the person CK in the extracted image IMG_EXT, thereby generating state information R_Info. In one embodiment, the state information R_Info may indicate an upper body ratio (; i.e., a ratio of an area of the upper body segment to an area of the whole body presented in the extracted image IMG_EXT). Specifically, the state calculation module 122 can perform segmentation processing on the human figure in the extracted image IMG_EXT to determine an upper body segment, a lower body segment, and other key segment, so as to calculate the upper body ratio. In other embodiments of the present invention, the state information R_Info may be a front rotation angle of the person (; i.e., a rotation angle of the front of the person relative to an image center of the extracted image IMG_EXT). Furthermore, the status information R_Info may be an occlusion ratio of the person in the extracted image IMG_EXT (i.e., a ratio of an area of a part of the person's body occluded by objects relative to an area of the whole body), or it may be parameters sufficient to indicate the person's posture. In addition, in some embodiments of the present invention, the status information R_Info may also be a set of parameters directed to a combination of one or more of the aforementioned state information, so as to better reflect all factors of the person's state or posture.

Figure 2:
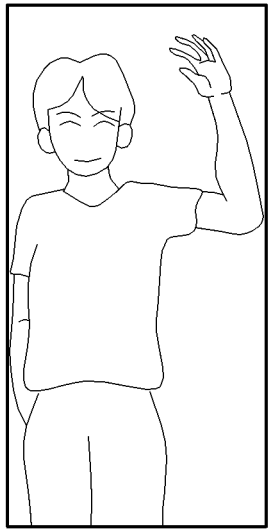
FIG. 2 shows a plurality of registered person feature vectors recorded by a re-identification database for a specific person according to one embodiment of the present invention.
Figure 2:
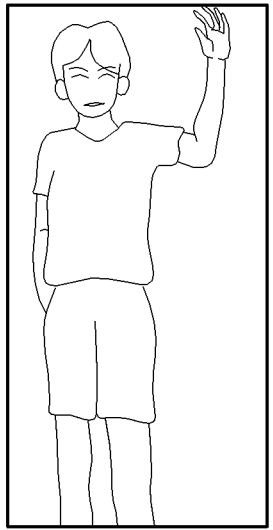
Figure 2:
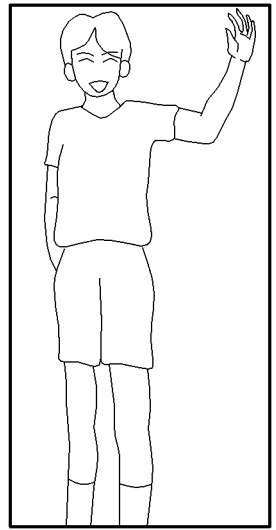
Figure 3:
FIG. 3 shows a plurality of registered person feature vectors recorded by a re-identification database for a specific person according to another embodiment of the present invention.
Figure 3:
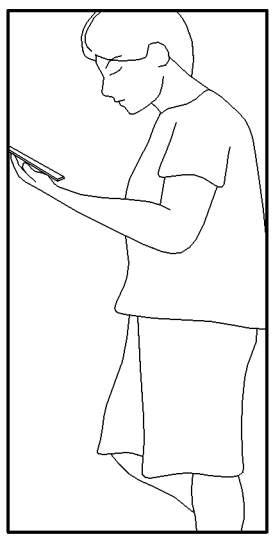
Figure 3:
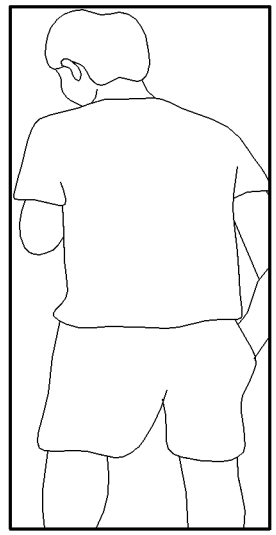

The database matching and updating module 123 is operable to compare the person feature vector VC_IN with all registered person feature vectors in the re-identification database 124. Specifically, the re-identification database 124 records person feature vectors corresponding to a plurality of different identities ID_1-ID_N. For a single identity, the re-identification database 124 records a sets of related person feature vectors. For example, the re-identification database 124 may record m registered person feature vectors VCreg_k_1-VCreg_k_m for an identity ID_k. Please refer to an embodiment shown in FIG. 2. This embodiment shows an example where m=3, and the database matching and updating module 123 uses the upper body ratio of the extracted image IMG_EXT as the updating and registration basis. Under this premise, the three different registered person feature vectors stored in the re-identification database 125 for the identity ID_k will be: the vector VCreg_k_1 corresponding to an image from person's head to person's waist, the vector VCreg_k_2 corresponding to an image from person's head to person's knee (; below person's waist are occluded), and the vector VCreg_k_3 corresponding to an image from person's head to person's thigh. These three registered person feature vectors VCreg_k_1-VCreg_k_3 correspond to different numerical ranges of the upper body ratio, respectively. For example, the registered person feature vector VCreg_k_1 may correspond to the upper body ratio of 60-90%, the registered person feature vector VCreg_k_2 may correspond to the upper body ratio of 30-60%, and the registered person feature vector VCreg_k_3 may correspond to the upper body ratio of 0-30%. Accordingly, the database matching and updating 123 will use the ratio thresholds TH1 (30%) and TH2 (60%) related to the upper body ratio to determine how to update the re-identification database 124 (which will be explained later). Furthermore, FIG. 3 shows that when m=3 and the database matching and updating module 123 uses person's front rotation angle in the extracted image IMG_EXT (; i.e., that is, a rotation angle of the person's front relative to an image center of the extracted image IMG_EXT) as the basis for updating and registration of the re-identification database 124. Under this premise, the three different registered person feature vectors recorded by the re-identification database 124 associated with an identity ID_k will be: the registered person feature vector VCreg_k_1 corresponding to an image with person's front rotation angle of 0-60 degrees, the registered person feature vector VCreg_k_2 corresponding to an image with person's front rotation angle of 60-120 degrees, and the registered person feature vector VCreg_k_3 corresponding to an image with person's front rotation angle of 120-180 degrees. Accordingly, the database matching and updating module 123 will use the angle thresholds TH1 (60 degrees) and TH2 (120 degrees) related to person's front rotation angle to determine how to update the re-identification database 124 (which will be explained later).

It should be noted that, in the above and subsequent descriptions, m=3 will be used to elaborate main concept of the invention, but this is not a limitation of the present invention. According to various embodiments of the present invention, the re-identification database 124 may record more or fewer registered person feature vectors with respect to a single identity. These more or fewer registered person vectors may respectively correspond to a narrower or wider numerical range of the status information R_Info. When the re-identification database 124 records more registered person feature vectors, the person re-identification system 100 has a better ability to track a person from the source images, but it will inevitability affect the response time of the recognition to a certain extent.

The database matching and updating module 123 compares the person feature vector VC_IN with all the registered person feature vectors in the re-identification database 124. If the database matching and updating module 123 finds from the re-identification database 124, a difference between the registered person feature vector VCreg_k_1 and the person feature vector VC_IN (e.g., Euclidean distance (L2) distance) is less than a threshold value THm, it is determined that the person feature vector VC_IN matches the registered person feature vector VCreg_k_1 corresponding to the identity ID_k. As such, the database matching and updating module 123 will use the identity ID_k to identify the person CK in the extracted image IMG_EXT. Furthermore, the database matching and updating module 123 will determine which one of the registered person feature vectors VCreg_k_1-VCreg_k_3 in the re-identification database 124 needs to be updated with the person feature vector VC_IN. Specifically, the database matching and updating module 123 will compare the state information R_Info obtained by the state calculation module 122 according to the extracted image IMG_EXT (which may be person's upper body ratio, person's front rotation angle, person's occlusion ratio, and/or person's posture, or a set of parameters corresponding to all factors mentioned above), with updating thresholds TH1 and TH2 (assuming the updating threshold TH2 is greater than the updating threshold TH1) to determine how to update.

If the state information R_Info of the extracted image IMG_EXT is less than the updating threshold TH1, the database matching and updating module 123 will use the person feature vector VC_IN to update the registered person feature vector VCreg_k_3 in the re-identification database 124 (assuming that the state information R_Info of the image which the registered person feature vector VCreg_k_3 is obtained from is less than TH1). If the status information R_Info of the extracted image IMG_EXT is greater than the update threshold TH1 but less than the update threshold TH2, the database matching and updating module 123 will use the person feature vector VC_IN to update the registered person feature vector VCreg_k_2 in the re-identification database 124 (assuming that the state information R_Info of the image which the registered person feature vector VCreg_k_2 is obtained from is greater than TH1 but less than TH2). If the state information R_Info of the extracted image IMG_EXT is greater than the updating threshold TH2, the database matching and updating module 123 will use the person feature vector VC_IN to update the registered person feature vector VCreg_k_1 in the re-identification database 124 (assuming that the state information R_Info of the image which the registered person feature vector VCreg_k_1 is obtained from is greater than TH2). Specifically, the updating thresholds TH1 and TH2 may be different according to what type of state the state information R_Info actually reflects.

Figure 4:
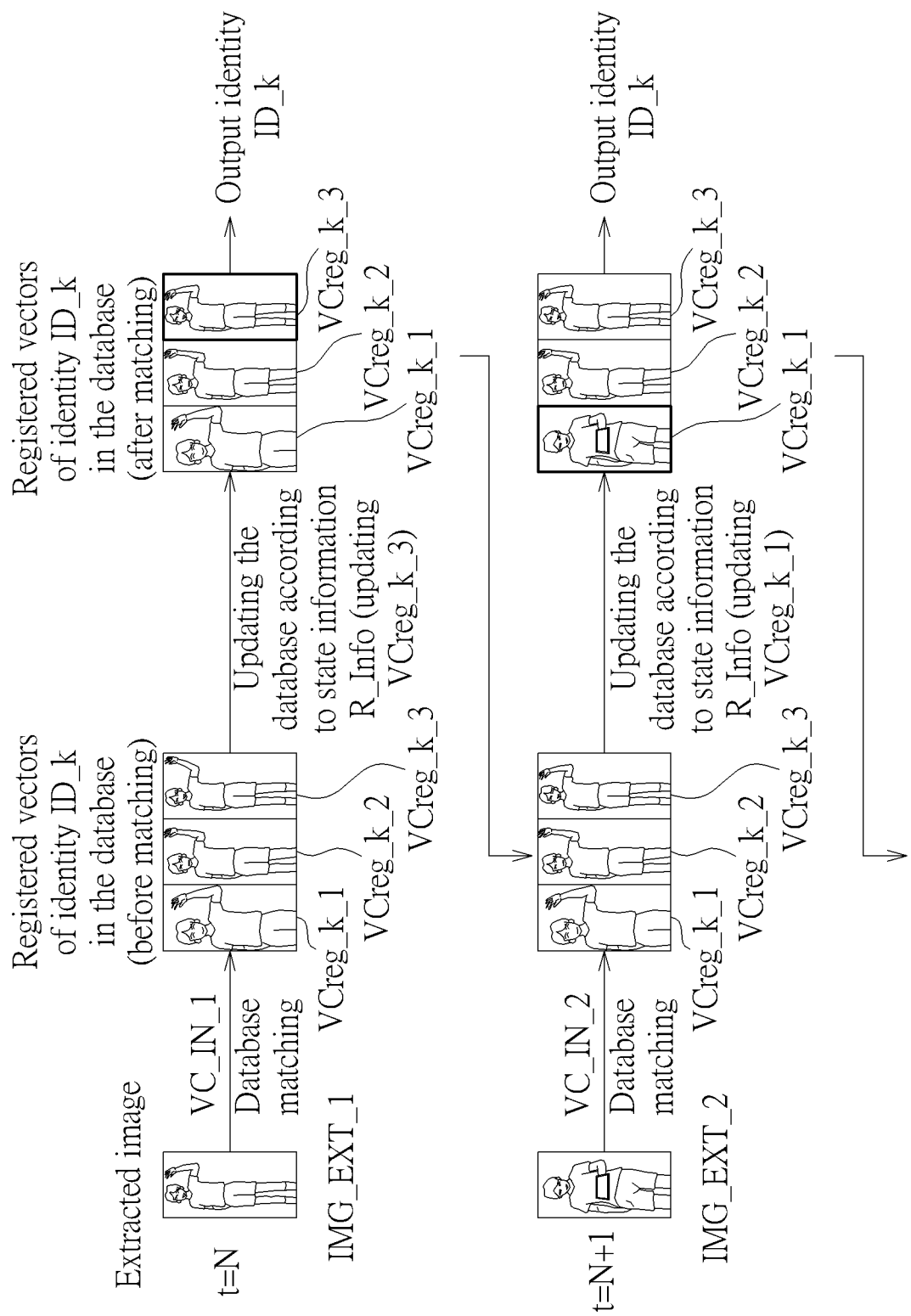
FIG. 4 shows an example of an updating process of a re-identification database according to one embodiment of the present invention.

FIG. 4 illustrates an updating process of according to one embodiment of the present invention. This embodiment will be explained with the state information R_Info being the upper body ratio. At the time t=N, the extracted image IMG_EXT_1 containing the person CK is converted into a person feature vector VC_IN_1, which is provided to the database matching and updating module 123 for being compared with all the registered person feature vectors in the re-identification database 124. Based on the calculation of the L2 distance, the person feature vector VC_IN_1 successfully matches the registered person feature vector corresponding to the identity ID_k. As such, the person CK in the extracted image IMG_EXT_1 is identified as the identity ID_k. According to the state information R_Info derived from the extracted image of IMG_EXT_1, the upper body ratio would be less than the updating threshold TH1 (i.e., the upper body ratio is 0-30%). In view of this, the person feature vector VC_IN_1 is utilized to update the registered person feature vector VCreg_k_3 (which corresponds to an image with person's upper body ratio of 0-30%) in the re-identification database in 124. Furthermore, at the time t=N+1, the extracted image IMG_EXT_2 is converted into a person feature vector VC_IN_2, which is provided to the database matching and updating module 123 for being compared with all the registered person feature vectors in the re-identification database 124. Based on the calculation of the L2 distance, the person feature vector VC_IN_2 successfully matches the registered person feature vector corresponding to the identity ID_k. As such, the person CK in the extracted image IMG_EXT_2 is again identified as the identity ID_k. According to the state information R_Info derived from the extracted image of IMG_EXT_2, the upper body ratio would be greater than the updating threshold TH2 (i.e., the upper body ratio is 30-60%). In view of this, the person feature vector VC_IN_2 is utilized to update the registered person feature vector VCreg_k_1 (which corresponds to an image with person's upper body ratio of 60-90%) in the re-identification database in 124. Through the above process, it can be ensured that the re-identification database 124 always stores the registered person feature vectors corresponding to the upper body ratios of different numerical ranges.

On the other hand, if the database matching and updating module 123 does not find any one of the registered person feature vectors in the re-identification database 124 successfully matches the person feature vector VC_IN (i.e., the differences between the person feature vector VC_IN and the registered person feature vectors are greater than the matching threshold THm), the database matching and updating module 123 will register a new identity ID_w into the re-identification database 124. Person feature vectors associated with the identity ID_w could be registered into the re-identification database 124 based on the person feature vector VC_IN, and other person feature vectors obtained from new images IMG_EXT later. If the state information R_Info of the extracted image IMG_EXT is less than the updating threshold TH1, the database matching and updating module 123 registers the person feature vector VC_IN as the person feature vector VCreg_w_3 in the re-identification database 124. If the state information R_Info of the extracted image IMG_EXT is greater than the updating threshold TH1 but less than the updating threshold TH1, the database matching and updating module 123 registers the person feature vector VC_IN as the person feature vector VCreg_w_2 in the re-identification database 124. If the state information R_Info of the extracted image IMG_EXT is greater than the updating threshold TH2, the database matching and updating module 123 registers the person feature vector VC_IN as the person feature vector VCreg_w_1 in the re-identification database 124. In some situations, the state information R_Info obtained from the following extracted images IMG_EXT may continue to fall within a same numerical range. For example, the state information R_Info remains greater than the updating threshold TH1 but less than the updating threshold TH2. If so, the database matching and updating module 123 does not register the person feature vectors VC_IN obtained from the following extracted images IMG_EXT as the person feature vector VCreg_k_1 and VCreg_k_3. Instead, these the person feature vectors VC_IN will be only used to update the registered person feature vector VCreg_k_2.

Through the above mechanism, it can be ensured that the re-identification database 124 covers as much as possible the feature vectors associated with all possible state changes of a person. In this way, even if the person's posture or state changes drastically, the person re-identification system 100 will have better adaptability. Specifically, if the updating thresholds TH1 and TH2 are not used to limit the updating of the registered person feature vectors, the re-identification database 124 will always update those registered vectors successfully matching the person feature vectors VC_IN. This may lead to a negative influence on re-identification. For example, if a person stays in a static state for a long time (such as, sitting or not occluded), updating the registered person feature vectors without any limitations will make the re-identification database 124 only record the registered person feature vectors associated with the person's static state. Eventually, the person re-identification system 100 may be only able to recognize the person's identity when the person is in a sitting state or is not occluded. Once the person suddenly changes his/her posture or state (such as, from a sitting state to a standing state, or from not occluded to occluded), the person re-identification system 100 may temporarily lose the ability to track and recognize the person. This is due to the lack of the registered feature vectors associated with the person's standing state, or the person being occluded. Through the database registration and updating management provided by the present invention, it can be ensured that the person feature vector VC_IN with a specific state will only be used to update the registered vector in the re-identification database 124 that has a similar state. For example, the person feature vector with person's sitting state or person's non-occluded state will only be used to update the registered person feature vectors corresponding to person's sitting state or person's non-occluded state. The person feature vector with person's standing state or person's occluded state will only be used to update the registered person feature vectors corresponding to person's standing state or person's occluded state. This ensures that the diversity of the registered person feature vectors in the re-identification database 124.

Figure 5:
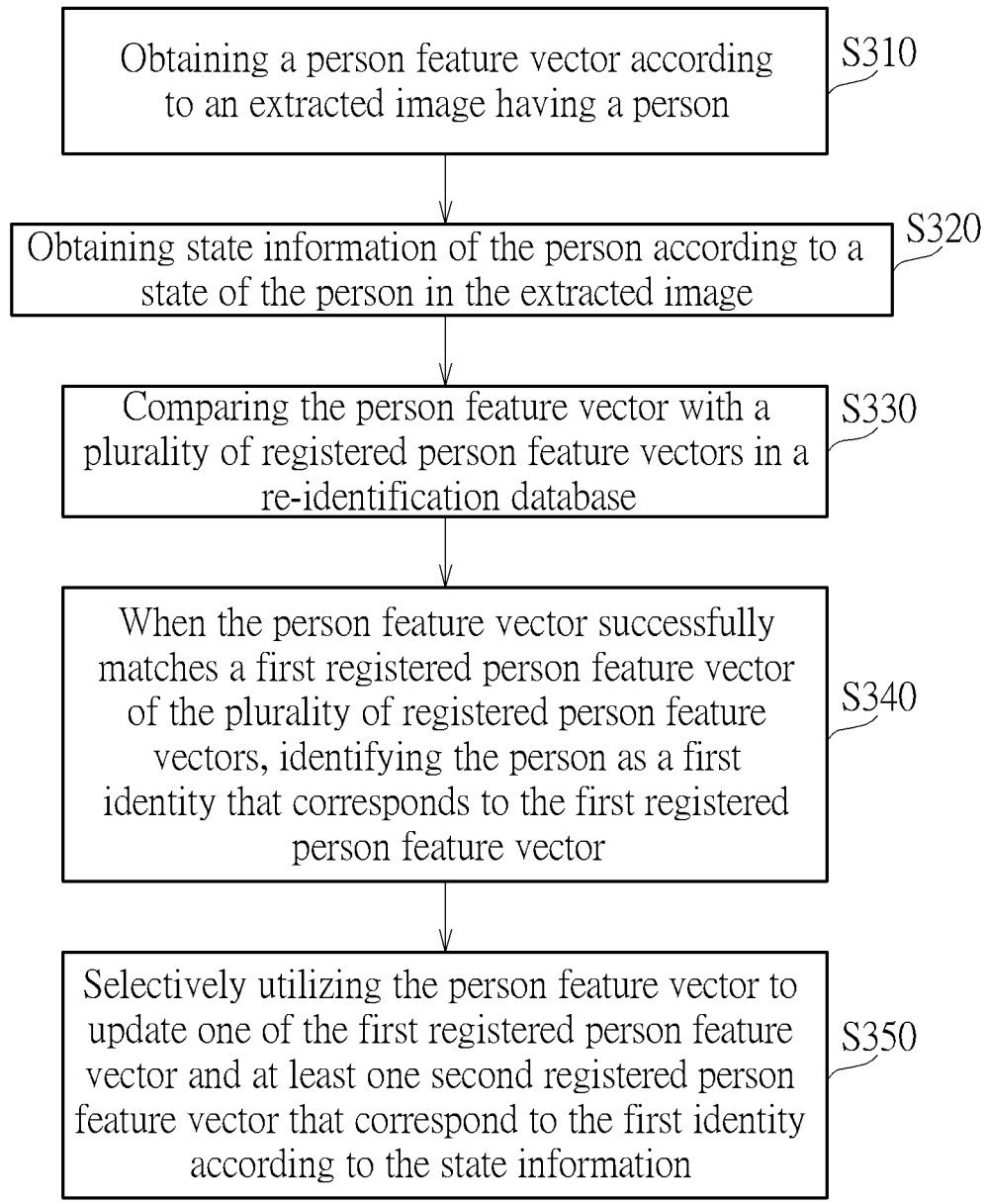
FIG. 5 illustrates a flow chart of performing person re-identification according to one embodiment of the present invention.

FIG. 5 illustrates a method of performing person re-identification according to one embodiment of the present invention. As shown in the figure, the method of the present invention includes the following simplified flow:

S310: obtaining a person feature vector according to an extracted image having a person;

S320: obtaining state information of the person according to a state of the person in the extracted image;

S330: comparing the person feature vector with a plurality of registered person feature vectors in a re-identification database;

S340: when the person feature vector successfully matches a first registered person feature vector of the plurality of registered person feature vectors, identifying the person as a first identity that corresponds to the first registered person feature vector; and S350: selectively utilizing the person feature vector to update one of the first registered person feature vector and at least one second registered person feature vector that correspond to the first identity according to the state information.

Figure 6:
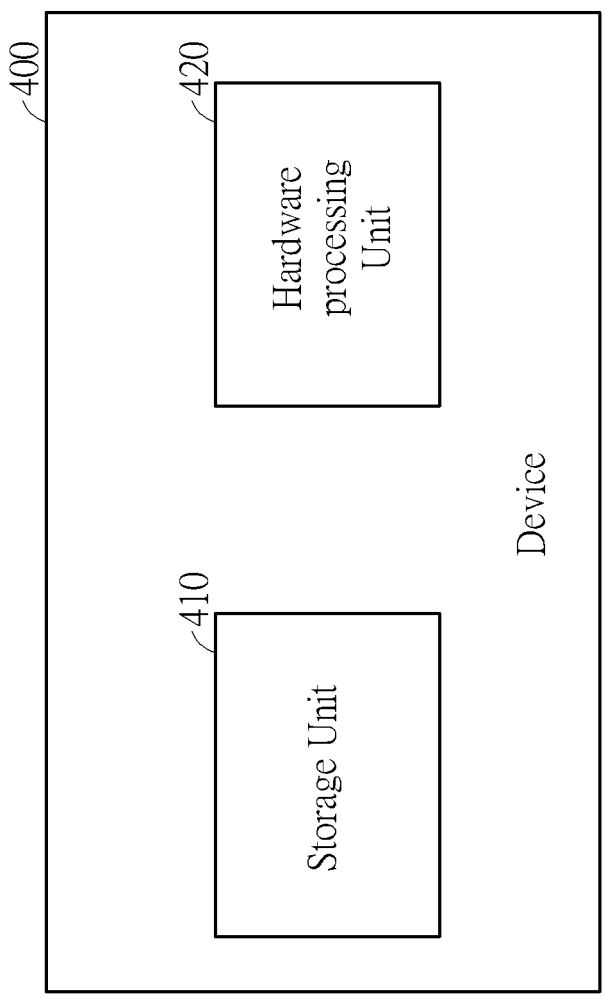
FIG. 6 shows a possible implementation of a person re-identification system according to one embodiment of the present invention.

Since principles and specific details of the foregoing steps have been explained in detail through the above embodiments, further descriptions will not be repeated here. It should be noted that the above flow may be possible, by adding other extra steps or making appropriate modifications and adjustments, to better realize the person re-identification and further improve the identification performance. Furthermore, all the operations set forth in the above embodiments can be implemented by a device 400 shown in FIG. 6. As in FIG. 6, a storage unit 410 (which can be a non-volatile memory, a volatile memory, or a combination of both) in the device 400 can be used to store program codes, commands, variables, or data. A hardware processing unit (i.e., a general-purpose processor) 420 in the device 400 can execute the program codes and instructions stored in the storage unit 410 and refer to the variables or data therein to perform all the operations in the above embodiments. In some embodiments of the present invention, one or more modules in the person re-identification system 100 may be implemented by a deep learning network (e.g., a convolutional neural network). In addition, in some embodiments of the present invention, one or more modules in the person re-identification system 100 can also be implemented by pure hardware circuits, such as application specific integrated circuits (ASICs), programmable gate array (PGA) or a field programmable gate array (FPGA) and so on.

In summary, the present invention proposes a method and related apparatus for managing the updating and registration of the person re-identification database based on the person's state information, so as to perform the person re-identification. In order to track person's state or posture changing, the embodiment of the present invention will update the re-identification database timely. Once the person feature vector calculated from the source image successfully matches the registered feature vector in the re-identification database, the present invention uses the current person feature vector to update the registered vector in the re-identification database. Furthermore, in order to ensure that the re-identification database can cover all possible state or posture changes, the embodiment of the present invention also refers to person's current state or posture identified from the source image when registering and updating the re-identification database. The current person feature vector will only be used to update the registered feature vector in the re-identification database that is similar to or related to person's current state or posture. In this way, the person re-identification database can retain registered feature vectors that are significantly different from person's current state or posture, so that the person can still be correctly identified even when person's state or posture changes drastically.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing person re-identification, comprising:
    obtaining a person feature vector according to an extracted image having a person;
    obtaining body state information of the person according to a body state of the person in the extracted image, wherein the body state information identifies at least one of an upper body ratio of the person in the extracted image, a front rotation angle of the person, an occlusion ratio of the person, and parameters regarding the person's posture;
    comparing the person feature vector with a plurality of registered person feature vectors in a re-identification database, wherein the plurality of registered person feature vectors correspond to a plurality of identities, respectively;
    for each identity, the corresponding registered person feature vectors are grouped into multiple sets, with each set corresponding to a specific numerical range of the body state information;
    when the person feature vector successfully matches a first registered person feature vector of the plurality of registered person feature vectors, identifying the person as a first identity that corresponds to the first registered person feature vector; and
    selectively utilizing the person feature vector to update one of the first registered person feature vector and at least one second registered person feature vector that correspond to the first identity according to the body state information, comprising:
        comparing the body state information with at least one updating threshold;
        if the body state information falls within a numerical range defined by the at least one updating threshold, utilizing the person feature vector to update the first registered person feature vector in a first set of the multiple sets; and
        if the body state information does not fall within the numerical range, utilizing the person feature vector to update the at least one second registered person feature vector in a second set of the multiple sets.

2. The method of claim 1, wherein the step of utilizing the person feature vector to selectively update one of the first registered person feature vector and the at least one second registered person feature vector comprises:
    comparing the body state information with a plurality of updating thresholds;
    if the body state information falls within a first numerical range defined by the plurality of updating thresholds, utilizing the person feature vector to update the first registered person feature vector;
    if the body state information falls within a second numerical range defined by the plurality of updating thresholds, utilizing the person feature vector to update the second registered person feature vector; and
    if the body state information falls within a third numerical range defined by the plurality of update thresholds, utilizing the person feature vector to update a third registered person feature vector corresponding to the first identity.

3. The method of claim 1, further comprising:
    if the person feature vector fails to match any one of the plurality of registered person feature vectors, registering a second identity corresponding to the person into the re-identification database;
    if the body state information falls within a numerical range defined by at least one updating threshold, registering the person feature vector into the re-identification database as a fourth registered person feature vector corresponding to the second identity; and
    if the body state information does not fall within the numerical range, registering the person feature vector into the re-identification database as a fifth registered person feature vector corresponding to the second identity.

4. An apparatus of performing person re-identification, comprising:
    a storage unit, configured to store program codes;
    a processing unit, configured to execute the program codes, thereby to perform operations of:
        obtaining a person feature vector according to an extracted image having a person;
        obtaining body state information of the person according to a body state of the person in the extracted image, wherein the body state information identifies at least one of an upper body ratio of the person in the extracted image, a front rotation angle of the person, an occlusion ratio of the person, and parameters regarding the person's posture;
        comparing the person feature vector with a plurality of registered person feature vectors in a re-identification database, wherein the plurality of registered person feature vectors correspond to a plurality of identities, respectively; for each identity, the corresponding registered person feature vectors are grouped into multiple sets, with each set corresponding to a specific numerical range of the body state information;

when the person feature vector successfully matches a first registered person feature vector of the plurality of registered person feature vectors, identifying the person as a first identity that corresponds to the first registered person feature vector; and selectively utilizing the person feature vector to update one of the first registered person feature vector and at least one second registered person feature vector that correspond to the first identity according to the body state information, comprising:

comparing the body state information with at least one updating threshold;

if the body state information falls within a numerical range defined by the at least one updating threshold, utilizing the person feature vector to update the first registered person feature vector in a first set of the multiple sets; and if the body state information does not fall within the numerical range, utilizing the person feature vector to update the at least one second registered person feature vector in a second set of the multiple sets.

5. The apparatus of claim 4, wherein when executing the program codes, the processing unit is configured to perform operations of:

comparing the body state information with a plurality of updating thresholds;

if the body state information falls within a first numerical range defined by the plurality of updating thresholds, utilizing the person feature vector to update the first registered person feature vector;

if the body state information falls within a second numerical range defined by the plurality of updating thresholds, utilizing the person feature vector to update the second registered person feature vector; and if the body state information falls within a third numerical range defined by the plurality of update thresholds, utilizing the person feature vector to update a third registered person feature vector corresponding to the first identity.

6. The apparatus of claim 4, wherein when executing the program codes, the processing unit is configured to perform operations of:

if the person feature vector fails to match any one of the plurality of registered person feature vectors, registering a second identity corresponding to the person into the re-identification database;

if the body state information falls within a numerical range defined by at least one updating threshold, registering the person feature vector into the re-identification database as a fourth registered person feature vector corresponding to the second identity; and if the body state information does not fall within the numerical range, registering the person feature vector into the re-identification database as a fifth registered person feature vector corresponding to the second identity.

* * * * *